Dec. 22, 1936.   W. E. HANN   2,064,975
CAR LOADING DEVICE
Filed May 27, 1933   2 Sheets-Sheet 2
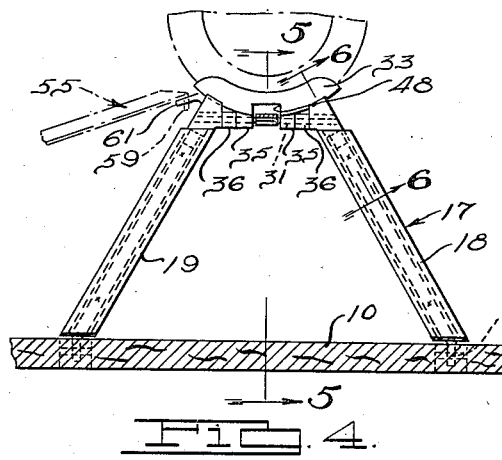
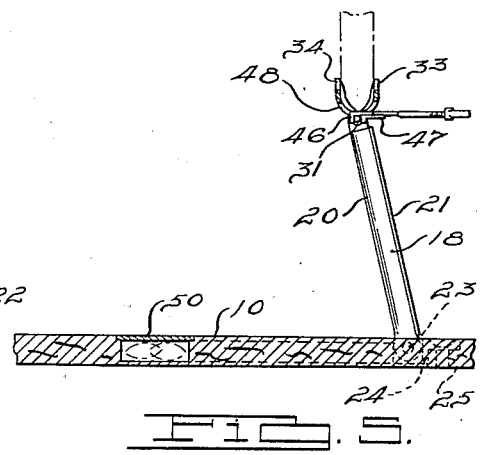
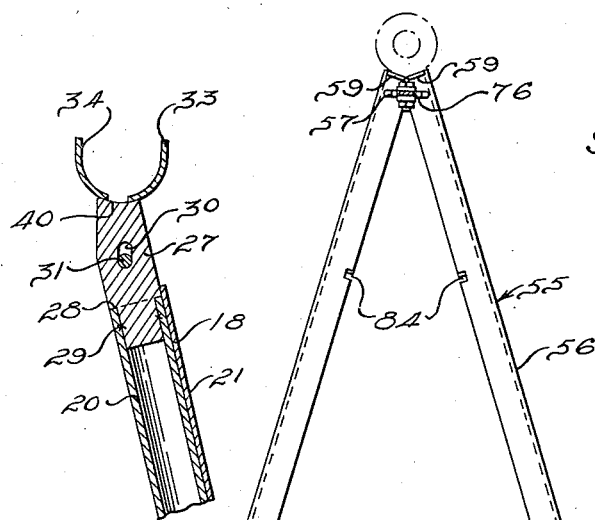
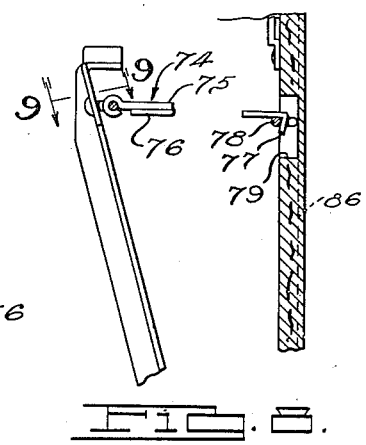
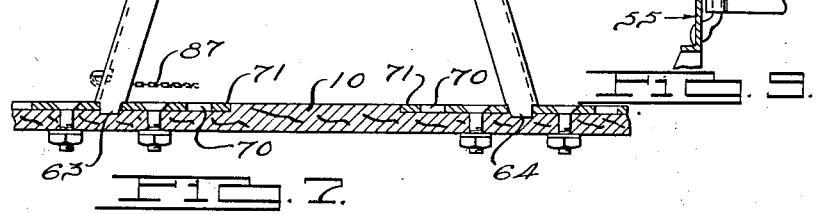
INVENTOR.
William E. Hann.
BY
ATTORNEYS.

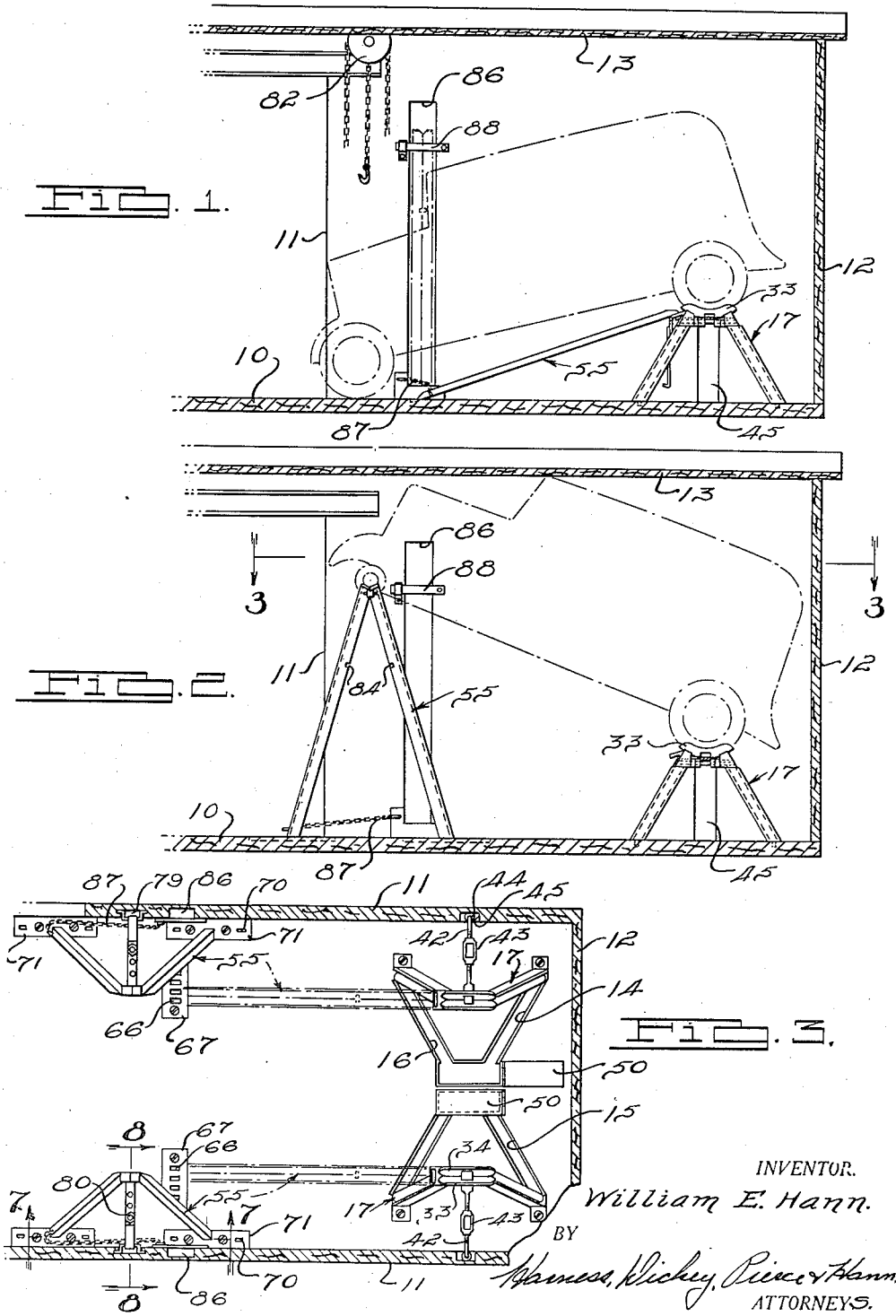

Patented Dec. 22, 1936

2,064,975

UNITED STATES PATENT OFFICE 2,064,975

CAR LOADING DEVICE

William E. Hann, Detroit, Mich., assignor to The Worth Company, a corporation of Michigan Application May 27, 1933, Serial No. 673,142

6 Claims. (Cl. 105—368)

The invention relates to loading devices and it has particular relation to a device for loading automobiles in freight cars for transportation purposes.

One object of the invention is to provide improved devices for loading automobiles in freight cars which are relatively simple and inexpensive in construction and which may permanently be associated with the freight car without interfering with the use of the latter for other purposes.

Another object of the invention is to provide improved devices for supporting the wheels of an automobile in elevated position in a freight car, which may be folded into recesses in the floor of the car when not in use, without interfering in effect, with the floor surface.

Another object of the invention is to provide a loading device including means for supporting one pair of vehicle wheels in elevated position and a ramp which initially may be used for rolling one end of the automobile into an elevated position and upon said supporting means and then used as a support for holding the other end of the automobile in an elevated position.

Another object of the invention is to provide automobile loading devices such as last mentioned which are adjustable for loading and supporting automobiles varying in width and length.

Another object of the invention is to provide a ramp which may be used in conjunction with the floor of the freight car for elevating one end of the automobile and then used for anchoring an end of the automobile in elevated position.

Other objects of the invention will become apparent from the following description, the drawings relating thereto and the claims hereinafter set forth.

For a better understanding of the invention, reference may be had to the drawings, wherein:

Figure 1 is a fragmentary and longitudinally cross-sectional view of a freight car illustrating a loading device constructed according to one form of the invention and the manner in which it is used initially to elevate and support one end of the automobile.

Fig. 2 is a view similar to Fig. 1 but illustrating how the other end of the automobile is secured or anchored in an elevated position.

Fig. 3 is a cross-sectional view taken substantially along the line 3—3 of Fig. 2.

Fig. 4 is a side elevational view on a larger scale illustrating the manner in which the rear end of the automobile is supported and the manner in which the ramp is used for elevating such end of the automobile.

Fig. 5 is a cross-sectional view taken substantially along the line 5—5 of Fig. 4.

Fig. 6 is a cross-sectional view on a larger scale taken substantially along the line 6—6 of Fig. 4.

Fig. 7 is a cross-sectional view on a larger scale taken substantially along the line 7—7 of Fig. 3.

Fig. 8 is a cross-sectional view on a larger scale taken substantially along the line 8—8 of Fig. 3.

Fig. 9 is a cross-sectional view taken substantially along the line 9—9 of Fig. 8.

Referring to Figs. 1, 2 and 3, the floor of the freight car is indicated at 10, its side walls at 11, an end wall at 12 and the roof at 13. At the end of the car and as best shown by Fig. 3, the floor is provided with a pair of substantially V-shaped recesses 14 and 15 and along the edges of the recesses, the floor is formed with shallow shoulders 16. Each of the recesses 14 and 15 is adapted to receive a substantially V-shaped wheel-supporting device 17 and it will be understood that these devices are disposed in the recesses when the freight car is to be used for purposes other than transporting automobiles.

As best shown by Figs 4 and 5, each of the devices 17 includes a pair of legs 18 and 19 and each of the legs comprises a metal tube 20 welded or otherwise secured to an elongated plate 21 that extends substantially throughout the length of the tube. The width of the plate 21 and its depth or thickness are such that when the devices 17 are disposed in the recesses 14 and 15, the tubes 20 will move into the deeper parts of the recesses while the plates 21 will rest at their edges on the shoulders 16 with the upper surface of the plates substantially flush with the upper surface of the floor of the freight car. The tubes 20 at their lower ends are formed with flattened eyes 22 which are adapted to receive pins 23 that project through eye portions of hinge brackets 24 bolted as indicated at 25 to the floor at the outer ends of the leg portions of the recesses therein. From this it will be appreciated that the device 17 may be pivotally moved downwardly into the recesses in the floor or pivoted into variable and upwardly directed positions above the floor.

As best shown by Fig. 6, each of the tubes 20 at its upper end receives a rounded end of a block 27 that has a shoulder 28 abutting the end face of the tube and such blocks may be welded to the wall of the tube as indicated at 29. The blocks 27 intermediate their ends are provided with elongated openings 30, receiving a pintle rod 31, which pivotally supports arcuate shoe elements 33 and 34, and as shown by Fig. 4, the shoe elements have eye portions 35 and 36 disposed in separated relation for receiving the pintle between the blocks. The lower and adjacent edge portions of the shoes, as shown by Fig. 6, rest on arcuate end faces 40 of the blocks 27 so that any load supported by the shoe is taken directly by the blocks without subjecting the pintle to strain. The lower edges of the two elements normally are separated when in their operative positions and this condition is advantageous in folding the devices 17 into the recesses of the floor as the shoe elements may be brought together to reduce their joint dimensions to such extent that they may be deposited in the recesses without protruding above the floor. The elongated slot 30, permits wider separation of the shoe elements 33 and 34 to accommodate tires of different widths and also to accommodate tires when the devices 17 are in variable pivoted positions.

When each of the devices 17 is in raised position, as shown by Fig. 3, it is held against lateral movement by a bracing bar 42 including a turn buckle 43 for adjusting the effective length of the bar, and such bar at its outer end has an eye portion which engages an eye bolt 44 secured to the wall 11 and which is located in a vertical recess 45 in such side wall. The inner end of the bar as best shown by Figs. 4 and 5, terminates in a downwardly directed lip 46 and adjacent this lip, an angle bracket 47 is welded to the rod to provide a second lip. This end of the bar is adapted to project through recesses 48 in the shoe elements 33 and 34 and to engage the pintle 31 between the eye portions 35 receiving the pintle. It will be evident, particularly in Fig. 5, that when a tire rests in the shoe elements 33 and 34, the base of the tire will substantially engage the upper side of the end portion of the bracing bar 42 and will prevent its vertical separation from the pintle 31. In this way a positive arrangement is maintained during transportation of the automobile. The vertical recess 45 in the side walls of the car is of such length that after disconnection of bracing bar 42 with respect to the device 17, the bar may be allowed to fall by gravity and it will swing into the recess 45. If desired, a latching element of suitable character may be provided on the side wall of the car to prevent the bar swinging laterally and inwardly out of the recess.

It will be noted that each of the devices 17 in its operative position, has its legs upwardly converging so as to reinforce it against strains induced by the tendency of the automobile to move longitudinally in the car or in other words, the device is braced longitudinally in both directions. The bracing bars in conjunction with the upwardly converging legs of the device 17 brace the automobile against movement both laterally and longitudinally.

When the devices 17 are not in use and the shoes 33 and 34 are brought together, the devices are lowered into the recesses 14 and 15 and the edges of the plates 21 substantially close the leg portions of the recesses to prevent effective interruption with the floor surfaces along the legs of the recesses. For providing a smooth floor surface over the shoe elements 33 and 34, pivoted cover plates 50 are provided which may be moved over the shoe elements so as to complete the floor surface in conjunction with the plate 21.

In mounting an automobile in the freight car, the devices 17 are employed to support one set of wheels and as shown, the rear set of wheels of the automobile. These devices are raised into operative position and the bracing bars 42 connected thereto and after proper adjustment to position the devices, the rear end of the automobile is elevated to place the wheels in the shoes 33 and 34 by using ramps 55 and rolling the automobile up these ramps. After positioning the rear wheels in the shoes of the devices 17, the ramps are employed for holding the front end of the automobile in elevated position and this is mentioned at this time because a detailed description of the ramps will be best understood by referring to figures showing them as used for supporting the front end of the automobile.

Referring to Figs. 7, 8 and 9, the ramp comprises angle irons 56 which are connected pivotally at one end by a substantially U-shaped element 57 having its ends secured respectively to the base portion of the angle irons in a rivetted manner as indicated at 58. This connection between the ends of the member 57 and the angle irons is such as to permit relative pivotal movement of the latter. The base portion of the angle irons at the side opposite their other legs are provided at their pivoted ends with lips 59 which are used to support the axle of the vehicle when the ramp is used for this purpose. However, when the ramps are employed for elevating the rear wheels, the lips 59 are adapted to project into recesses in ears 61 integral with or rigidly connected to the forward blocks 27 of devices 17. The opposite ends of the angle irons 56 are provided with projections 63 and 64 and when the ramp is used for elevating the rear end of the automobile, these projections are adapted to selectively fit in laterally spaced slots 66 formed in plates 67 bolted to the floor at opposite sides of the freight car. Below these plates the floor is recessed to permit proper projection of the portions 63 and 64 through the plates. It will be appreciated in Fig. 1, how the ramps are positioned by inserting the lips 59 and 60 in the recessed ears 61 on blocks 27 and how the projections 63 and 64 cooperate with the recesses in the plates 67.

It will be appreciated in Fig. 3 that by adjustment of the turn buckles 43 of the bracing bars 42, the devices 17 may be pivotally moved into variable positions and that the projections 63 and 64 may be selectively positioned in certain of the slots 66 in the plates 67. In this way the ramps can be separated variable distances laterally of the car during which the devices 17 also can be moved apart farther by adjustment of the bracing bars 42. Thus automobiles of variable width may be elevated by the ramps and supported by the devices 17. After positioning the rear wheels of the automobile as shown by Fig. 1, suitable chain fastening devices may be employed if desired to hold the wheels positively against movement in the shoes and then the ramps may be removed.

Referring now to Figs. 3 and 7 particularly, the projections 63 and 64 on one end of the angle irons 56 are adapted also to cooperate with recesses 70 formed in plates 71 adjacent the lower edge of the side walls of the freight car. By separating the angle irons the lower portions may be disposed in the recesses in the separated plates 71 and spread farther apart or together shifted longitudinally by providing a number of the recesses 70 adapted selectively to cooperate with the projections 63 and 64. As best shown by Fig. 8, the U elements 57 at the now upper end of the ramp supports are pivotally connected to lateral bracing elements 74 comprising a pair of bars 75 and 76 overlapping one another and the plate 76 at its outer end has a hook portion 77 adapted to cooperate with an eye 78 secured to the side wall of the car and disposed in a recess 79 therein. The plates 75 and 76, as best shown by Fig. 3, have openings therein which selectively may receive a bolt 80 so that the effective length of the bracing elements may be varied, and in this manner the upper ends of the ramps variably positioned laterally of the car.

Preferably, the front wheels of the vehicle are removed and then this end of the vehicle may be elevated by suitable chain falls indicated at 82, after which the ramps may be positioned as shown by Fig. 3 with their upper ends under the ends of the axle and the chain falls operated to lower the vehicle until the axle fits and rests on the lips 59 and 60. Suitable chain devices also may be used for securing the axle positively in place and to the ramps.

When the freight car is to be used for other purposes, the ramps may be folded together and, as shown by Fig. 1, disposed in a vertical recess 86 formed in the side walls of the car, and if desired, notches 84 may be provided in the angle irons 56 to receive the hook portions 77 of the bracing devices 74. For permanently connecting the ramps to the freight car, chains 87 may be secured to the side wall of the freight car in enlarged portions of the recess 86 at the lower ends thereof and these chains are of sufficient length to permit the necessary manipulation of the ramps either for elevating the rear end of the vehicle or for supporting the front end thereof. A latching bar 88 may be used adjacent the upper end of the recess 86 to prevent removal of the ramps after disposal in the recesses.

In the event the side walls of the car are not adapted to have recesses therein for receiving the ramps, the floor may be provided with recesses for this purpose. All recesses provided in either the side walls or floor need not be deeper than the thickness of wall or floor.

The invention provides a desirable and permanent loading device for automobiles, which is simple and inexpensive and which may be constructed entirely of metal. It will be appreciated that the ramps facilitate elevating the rear end of the vehicle and then that these ramps may be used also for supporting the front end of the vehicle, and this reduces the number of parts ordinarily required and hence reduces the cost. Moreover, automobiles may be disposed in semi-decked positions in an efficient and rapid manner, so as to reduce manipulation costs in loading them in the freight cars. Also when the loading devices are not in use, they are disposed in out of the way positions so as not to interfere with ordinary use of the freight car.

Although only one form of the invention has been described and illustrated in detail, it will be apparent to those skilled in the art that various modifications may be made without departing from the scope of the appended claims.

I claim:

1. In combination with a freight car or the like, means movably connected to the car for supporting a part of an automobile in elevated position, and means separably and operatively connected to the first means for preventing movement of the latter when in operative position said second means being directly engaged by the automobile for positively preventing separation of the second means when the automobile is in its supported position.

2. In combination with a freight car, means pivotally connected to the car for supporting a part of an automobile, and releasable means for preventing movement of said first means when in operative position, said releasable means being directly engaged by the automobile for positively preventing release of said releasable means when the automobile is supported in its operative position.

3. In combination with a freight car or the like, means connected to the car for supporting one end of an automobile in elevated position, an inclined ramp resting on said supporting means and the floor of the car for enabling movement of such end of the automobile into its elevated and supported position, said ramp being removable and utilizable for holding the other end of the automobile in an elevated position.

4. In combination with a freight car or the like, means connected to the car for supporting one end of an automobile in elevated position, an inclined ramp resting on said supporting means and the floor of the car for enabling movement of such end of the automobile into its elevated position, said ramp being removable and utilizable, for holding the other end of the automobile in a position elevated with respect to the elevated first end.

5. In combination with a freight car or the like, means for supporting one end of an automobile in elevated position, and a pair of inclined ramps resting on said supporting means and on the floor of the car for enabling rolling such end of the automobile into its elevated and supported position, such ramps being removable and utilizable for holding the other end of the automobile in elevated position after elevation of the first end.

6. A ramp for elevating a wheel of an automobile comprising elongated members adapted jointly to provide an inclined support for rolling the wheel into its elevated position, and means movably connecting the members to enable changing the ramp into a V-shape brace.

WILLIAM E. HANN.